US010805065B2

(12) United States Patent
Glasmachers et al.

(10) Patent No.: US 10,805,065 B2
(45) Date of Patent: Oct. 13, 2020

(54) ELECTRICAL DEVICE AND STORAGE SYSTEM WITH AN ELECTRICAL DEVICE

(71) Applicant: KROHNE Messtechnik GmbH, Duisburg (DE)

(72) Inventors: Holger Glasmachers, Bochum (DE); Michael Deilmann, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 213 days.

(21) Appl. No.: 15/970,050

(22) Filed: May 3, 2018

(65) Prior Publication Data

US 2018/0323961 A1 Nov. 8, 2018

(30) Foreign Application Priority Data

May 3, 2017 (DE) .................. 10 2017 109 415

(51) Int. Cl.
*H04L 9/06* (2006.01)
*G06F 21/72* (2013.01)
*G06F 21/60* (2013.01)
*H04L 29/06* (2006.01)

(52) U.S. Cl.
CPC .......... *H04L 9/0618* (2013.01); *G06F 21/606* (2013.01); *G06F 21/72* (2013.01); *H04L 63/0435* (2013.01)

(58) Field of Classification Search
CPC . H04L 9/0618; H04L 63/0435; G06F 21/606; G06F 21/72; G06F 21/78; G06F 21/31
USPC .......................................................... 380/28
See application file for complete search history.

(56) References Cited

U.S. PATENT DOCUMENTS

| 6,005,942 A * | 12/1999 | Chan ....................... G06F 21/51 235/379 |
| 9,602,280 B2 | 3/2017 | Scarpino et al. |
| 2005/0071655 A1 | 3/2005 | de Jong |
| 2006/0069826 A1 | 3/2006 | Lei et al. |
| 2013/0061034 A1* | 3/2013 | Walheim, Sr. ...... H04L 63/0272 713/150 |
| 2014/0064479 A1 | 3/2014 | Manikandan et al. |
| 2016/0366131 A1* | 12/2016 | Kostadinov ........... H04L 9/3247 |

(Continued)

FOREIGN PATENT DOCUMENTS

DE 102015202215 A1 3/2016
EP 2244414 A1 10/2010

*Primary Examiner* — Kambiz Zand
*Assistant Examiner* — Aubrey H Wyszynski
(74) *Attorney, Agent, or Firm* — Whitmyer IP Group LLC

(57) ABSTRACT

An electrical device includes a functional unit subdivided into a secure functional block and a non-secure functional block. The functional unit has a single transmission device for transmitting information from the secure functional block into the non-secure functional block. The functional unit has a first interface device and the first interface device is arranged in the non-secure functional block. A key is stored in the secure functional block. The secure functional block is designed to assign an identifier to a meaning using the key, to form a value pair from the identifier and a value, and to transmit the value pair via the transmission device in the non-secure functional block. The non-secure functional block is designed to transmit the value pair via the first interface.

19 Claims, 1 Drawing Sheet

(56) References Cited

U.S. PATENT DOCUMENTS

2018/0047023 A1* 2/2018 Bouda ................. G06Q 20/20
2018/0324160 A1* 11/2018 Axen .................. H04L 63/062

* cited by examiner

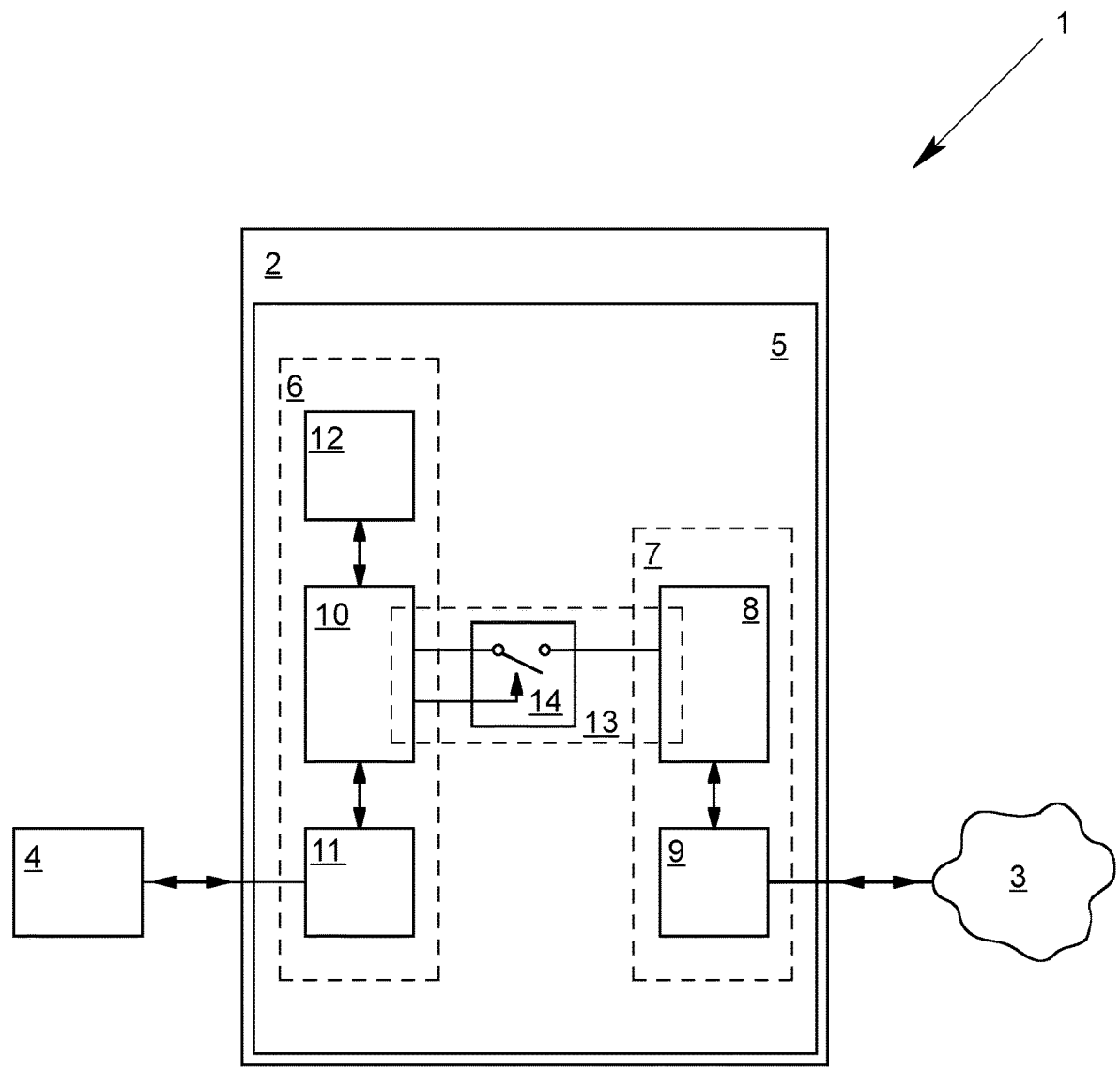

ELECTRICAL DEVICE AND STORAGE SYSTEM WITH AN ELECTRICAL DEVICE

TECHNICAL FIELD

The invention relates to an electrical device with a functional unit, wherein the functional unit is subdivided into a secure functional block and a non-secure functional block. The functional unit has only a single transmission device for the transmission of information exclusively from the secure functional block to the non-secure functional block. Furthermore, the functional unit has a first interface device, wherein the first interface device is arranged in the non-secure functional block. Moreover, the invention also relates to a storage system with an electrical device and a non-secure storage device.

BACKGROUND

Electrical devices are used, for example, in industrial systems for implementing a variety of functions. The functional unit of such a device has suitable hardware and/or software for implementing the functions. The implementation of the functions usually requires the processing and transmission of information. This information can also be sensitive information, which is why this sensitive information needs to be protected from access by unauthorized persons.

The functional unit is subdivided into the secure and the non-secure functional block, wherein the first interface device is arranged in the non-secure functional block. The subdivision into the functional blocks is a functional division of the functional unit. Accordingly, each of the functional blocks is associated with the hardware and/or software of the functional unit, which is required to implement the respective functions. In the given context, "secure", for example in conjunction with a functional block, means that sensitive information is protected from access by unauthorized persons, which makes the access more difficult and ideally impossible. Conversely, "non-secure" means that sensitive information is no longer protected from access by unauthorized persons.

The functional unit and thus the electrical device has only one transmission device. This transmission device is designed to transmit information exclusively from the secure functional block into the non-secure functional block. A transfer in the opposite direction is not implemented. The transmission device ensures that only information in the non-secure functional block and not information in the secure functional block can be accessed by unauthorized persons via the first interface, whereby making the secure functional block secure and the non-secure functional block non-secure.

There is a desire in the industry to connect electrical devices in industrial systems and devices in information and communication technology to one another to exchange information. This is to make it possible to further optimize the processes in industrial systems. Aspirations in this direction are also referred to as "Industry 4.0". However, connecting devices in industrial systems to devices in information and communication technology makes it easier than before for unauthorized persons to access information in non-secure areas, such as the non-secure functional block.

SUMMARY

An object of the present invention is therefore to provide an electrical device and a storage system with an electrical device, in which the access to information in non-secure areas is made at least more difficult for unauthorized persons.

The stated object is achieved by an electrical device according to a first teaching initially and essentially in that a key is stored in the secure functional block of the functional unit, that on the one hand, the secure functional block is designed to assign an identifier to a meaning using the key, to form a value pair from the identifier and a value, and to transmit the value pair via the transmission device into the non-secure functional block and that on the other hand, the non-secure functional block is designed to transmit the value pair via the first interface.

The stated object is achieved by an electrical device according to a second teaching initially and essentially in that a key is stored in the secure functional block, that on the one hand, the secure functional block is designed to encrypt a meaning and/or a value using the key and to transmit the encrypted meaning and/or the encrypted value via the transmission device into the non-secure functional block and, on the other hand, that the non-secure functional block is designed to transmit the encrypted meaning and/or the encrypted value via the first interface. Further, the secure functional block is designed to also transmit the meaning or value that is not encrypted to the non-secure functional block via the transmission device, and the non-secure functional block is designed to transmit the meaning or the value that is not encrypted via the first interface.

The key is stored in the secure functional block of the functional unit according to both teachings, that is according to both the first and second teachings, whereby it is protected from access by unauthorized persons. However, the key according to the first teaching differs from the key according to the second teaching. The key according to the first teaching assigns an identifier to a meaning, whereas the key according to the second teaching encrypts a meaning and/or a value. Although only one key is mentioned in the teachings of the invention, the teachings are by no means limited to one key, but several keys can be used analogous to one key.

The key according to the first teaching assigns an identifier to a meaning and forms a value pair of the identifier and a value. Usually the meaning explains the value so that the value can be interpreted. For example, the value is a number and the meaning explains that this number is a voltage and the unit of voltage is volts. The key assigns an identifier to a meaning so that unauthorized persons do not gain access to the meaning of the value when accessing the value pair. The identifier thus does not allow conclusions about the meaning of the value. Accordingly, the key anonymizes the value pair. Although the first teaching only mentions one assignment of an identifier to a meaning using a key, several assignments of each one identifier to one meaning can be stored in one key.

The key according to the second teaching encrypts the meaning and/or the value, which is why the meaning and/or the value has/have no meaning for unauthorized persons after access has been obtained. The encryption according to the second teaching thus goes beyond the anonymization according to the first teaching with regard to the impediment of access by unauthorized persons. The key according to the second teaching is usually a cryptographic key, as used for example in SSL. Thus, the second teaching involves the implementation of a cryptographic method.

In one design of the first teaching, it is provided that the secure functional block is additionally designed to encrypt the value pair or the meaning or the value using a cryptographic method. The cryptographic method is, for example, one according to the second teaching, according to which the value pair or meaning or value is encrypted.

According to the two teachings, the non-secure functional block is designed to transmit the value pair or the meaning and/or the value via the first interface to a receiving device, wherein the receiving device is, in particular, a non-secure receiving device and the connection between the non-secure functional block and the receiving device can also be an non-secure connection. Here too, "non-secure" has the meaning described above. Although only one value pair or a meaning and/or a value is mentioned in the teachings of the invention, the teachings are by no means limited to one value pair or one meaning and/or one value, but several value pairs or meanings and/or values can be used analogous to one value pair or one meaning and/or one value. A value pair or a meaning and/or a value contains a piece of information that can be sensitive.

Access to information in the non-secure functional block by unauthorized persons is in any case made more difficult using anonymization according to the first teaching and using encryption according to the second teaching. Access to information does not mean access to the value pair or the meaning and/or the value itself, but rather to the information in the value pair or the meaning and/or the value. This information is only revealed when the meaning of the value in the value pair or the value is known. For this, authorized persons have an inverse key to the key, so that they can assign the identifier to the meaning again or decrypt the meaning and/or the value.

It is provided in one design of the electrical device that the transmission device can be activated and deactivated and that the secure functional block is designed for activating and deactivating the transmission device. The activating and deactivating capability of the transmission device enhances the subdivision of the functional unit into the secure functional block and the non-secure functional block, thereby improving the security of the electrical device against access of information by unauthorized persons.

In a further design, it is provided that the functional unit has a second interface device and that the second interface device is arranged in the secure functional block. While the first interface device is arranged in the non-secure functional block, the second interface device is arranged in the secure functional block and accordingly is used for the transmission of information to a secure receiving device. For example, secure receiving devices are receiving devices within an industrial system where access by unauthorized persons is difficult. These include, in particular, programmable logic controllers in industrial systems.

If the functional unit has a second interface device and the second interface device is arranged in the secure functional block, then it is furthermore advantageous when the secure functional block is designed to receive the key via the second interface device and to store it in the secure functional block. Thus, the key stored in the secure functional block can be easily predefined and changed.

In a further design, it is provided that the electrical device is a field device. Field devices are used, in particular, in industrial systems for process automation. Process automation is concerned with the automation of industrial processes, such as manufacturing processes. Such processes are controlled by actuators and monitored by sensors. Actuators are, for example, control elements and valves. Sensors include, for example, flow, level, temperature, pressure, analysis, gas and steam measuring devices. Such actuators and sensors are preferably designed as field devices, with field devices having an interface device for the transmission of information. The interface device is, for example, a secure or non-secure interface device.

If the electrical device is a field device, it is furthermore advantageous when the functional unit has a measuring device and the measuring device is arranged in the secure functional block. As a result, the processing of the information generated by the measuring device and the control of the measuring device take place in the secure functional block, whereby access is made more difficult for unauthorized persons.

The invention also relates, as already stated, to a storage system having a previously described electrical device and a non-secure storage device in the form of a receiving device.

The stated object is achieved by a storage system according to a third teaching initially and essentially in that the electrical device is connected via the first interface device to the storage device for exchanging information and in that the storage device is designed for storing the value pair or the meaning and/or the value. Although only the storage of one value pair or one meaning and/or one identifier is mentioned in the teachings of the invention, the teachings are by no means limited to the storage of one value pair or one meaning and/or one identifier, but the storage of several value pairs or meanings and/or identifiers can be used analogous to one value pair or one meaning and/or one identifier.

The non-secure storage device is, for example, a cloud storage device. Cloud storage devices are non-secure as they are usually located outside of an industrial facility, making access by unauthorized persons easier than with a storage device located within an industrial facility. The above statements also apply with respect to the electrical device.

In detail, there is a plurality of possibilities for designing and further developing the electrical device and the storage system. Reference is made to both the claims subordinate to the independent claims and to the following description of a preferred embodiment in conjunction with FIG. 1.

BRIEF DESCRIPTION OF THE DRAWING

FIG. 1 shows abstracted and schematically the storage system 1.

DETAILED DESCRIPTION

Referring to FIG. 1, the storage system 1 comprises the electrical device 2, the non-secure storage device 3 in the form of a cloud storage device and the control room 4.

The electrical device 2 has the functional unit 5. The functional unit 5 is subdivided into the secure functional block 6 and into the non-secure functional block 7. The non-secure functional block 7 has the first control unit 8 and the first interface device 9. The secure functional block 6 also has the measuring device 12 in addition to the second control unit 10 and the second interface device 11. Furthermore, the functional unit 5 has the only transmission device 13 for transmitting information from the secure functional block 6 into the non-secure functional block 7. Thus, the transmission device 13 partly belongs both to the secure functional block 6 and to the non-secure functional block 7.

The first control unit 8 and the first interface device 9 are connected to one another via a connection and designed for the bidirectional exchange of information via this connection. Furthermore, the first interface device 9 and the non-secure storage device 3 are connected to one another via a connection and designed for the bidirectional exchange of information via this connection.

Correspondingly, the second control unit 10 and the second interface device 11 are connected to one another via a connection and designed for the bidirectional transmission of information via this connection. Furthermore, the second interface device 11 and the control room 4 are connected to one another via a connection and designed for the bidirectional transmission of information via this connection.

The transmission device 13 has the controllable switch 14, by means of which the transmission device 13 can be activated and deactivated. When the switch 14 is closed, the transmission device 13 is active, and when the switch 14 is opened, the transmission device 13 is inactive. Only when the transmission device 13 is active, i.e. the switch 14 is closed, can any information be transmitted from the secure functional block 6 into the non-secure functional block 7. Even if the transmission device 13 is active, no transmission of information from the non-secure functional block 7 into the secure functional block 6 is possible. The controllable switch 14 is controlled from the secure functional block 6 by the second control unit 10. The control unit 10 is accordingly designed for activation and deactivation of the transmission device 13.

The measuring device 12 is a temperature measuring device in this embodiment. It measures a temperature at one location in the unit Celsius. The second control unit 10 controls the measuring device 12 and reads a measured temperature as a value via the corresponding connection. In the second control unit 10, the meaning is stored so that the measuring device 12 is a temperature measuring device at a specific location and that the temperature is measured in Celsius.

The control room 4 transmits a key which is stored in the second control unit 10 and thus in the secure functional block via the second interface device 11 to the second control unit 10. In this embodiment, the key assigns an identifier to the given meaning. The second control unit 10 is designed to assign the identifier to given meaning using the key, to form a value pair from the identifier and the value, and to transmit the value pair via the transmission device 13 to the non-secure functional block 7. For the transmission, the second control unit 10 activates the transmission device 13. By transmitting the identifier and not the meaning, the value is anonymized, so that unauthorized persons cannot extract meaningful information from the value pair.

In an embodiment modified from the above embodiment, the key is a cryptographic key. The control unit 10 is then designed to form a value pair from the given meaning and the value, to encrypt the value pair, i.e. both the meaning and the value, using the key and then to transmit the encrypted value pair via the transmission device 13 into the non-secure functional block 7.

The first control unit 8 in the non-secure functional block 7 is designed both in the embodiment and in the modified embodiment to transmit the transmitted value pair via the first interface device 9 to the non-secure storage device 3. The non-secure storage device 3 then stores the value pair.

Authorized persons have an inverse key to the key, so that they not only have access to the value pair via the non-secure storage device 3, but can also reassign the identifier to the meaning or decrypt the meaning and the value.

The invention claimed is:

1. An electrical device, comprising:
   a functional unit;
   wherein the functional unit is subdivided into a secure functional block and a non-secure functional block;
   wherein the functional unit has a single transmission device for transmitting information from the secure functional block into the non-secure functional block;
   wherein the functional unit has a first interface device and the first interface device is arranged in the non-secure functional block;
   wherein a key is stored in the secure functional block;
   wherein the secure functional block is designed to assign an identifier to a meaning using the key, to form a value pair from the identifier and a value, and to transmit the value pair to the non-secure functional block via the transmission device; and
   wherein the non-secure functional block is designed to transmit the value pair via the first interface.

2. The electrical device according to claim 1, wherein the secure functional block is designed to encrypt the value pair or the meaning or the value using a cryptographic method.

3. An electrical device, comprising:
   a functional unit;
   wherein the functional unit is subdivided into a secure functional block and a non-secure functional block;
   wherein the functional unit has a single transmission device for transmitting information from the secure functional block into the non-secure functional block;
   wherein the functional unit has a first interface device and the first interface device is arranged in the non-secure functional block;
   wherein a key is stored in the secure functional block;
   wherein the secure functional block is designed to encrypt a meaning and/or a value using the key and to transmit an encrypted meaning and/or an encrypted value via the transmission device into the non-secure functional block; and
   wherein the non-secure functional block is designed to transmit the encrypted meaning and/or the encrypted value via the first interface.

4. The electrical device according to claim 1, wherein the transmission device is designed to be activated and deactivated, and the secure functional block is designed for activating and deactivating the transmission device.

5. The electrical device according to claim 1, wherein the functional unit has a second interface device, and the second interface device is arranged in the secure functional block.

6. The electrical device according to claim 5, wherein the secure functional block is designed to receive the key via the second interface device and store it in the secure functional block.

7. The electrical device according to claim 1, wherein the electrical device is a field device.

8. The electrical device according to claim 7, wherein the functional unit has a measuring device and the measuring device is arranged in the secure functional block.

9. A storage system with an electrical device according to claim 1 and a non-secure storage device;
   wherein the electrical device and the storage device are connected to one another via the first interface device for exchanging information; and
   wherein the storage device is designed to store the value pair or the meaning and/or the value.

10. The electrical device according to claim 2, wherein the transmission device is designed to be activated and deactivated, and the secure functional block is designed for activating and deactivating the transmission device.

11. The electrical device according to claim 10, wherein the functional unit has a second interface device, and the second interface device is arranged in the secure functional block.

12. The electrical device according to claim 11, wherein the secure functional block is designed to receive the key via the second interface device and store it in the secure functional block.

13. The electrical device according to claim 12, wherein the electrical device is a field device, the functional unit has a measuring device, and the measuring device is arranged in the secure functional block.

14. The electrical device according to claim 1, wherein the secure functional block is designed to encrypt the meaning and the value using the key and to transmit the encrypted meaning and the encrypted value via the transmission device into the non-secure functional block.

15. The electrical device according to claim 14, wherein the meaning explains the value so that the value can be interpreted.

16. The electrical device according to claim 1, wherein the single transmission device is designed to transmit information from the secure functional block exclusively into the non-secure functional block.

17. The electrical device according to claim 1, wherein the secure functional block is designed for activating and deactivating the transmission device via a controllable switch; and wherein the functional unit is designed for transmitting information from the secure functional block into the non-secure functional block only when the switch is closed.

18. The electrical device according to claim 1, wherein the functional unit includes a measuring device for generating information indicative of a condition of a local environment; and wherein the functional unit is designed such that processing of the information generated by the measuring device and control of the measuring device takes place exclusively in the secure functional block.

19. The electrical device according to claim 1, wherein the key is stored exclusively in the secure functional block.

* * * * *